April 8, 1941.  C. L. DELACHAUX  2,237,590
TROLLEY SYSTEM
Filed Aug. 5, 1939  4 Sheets-Sheet 1
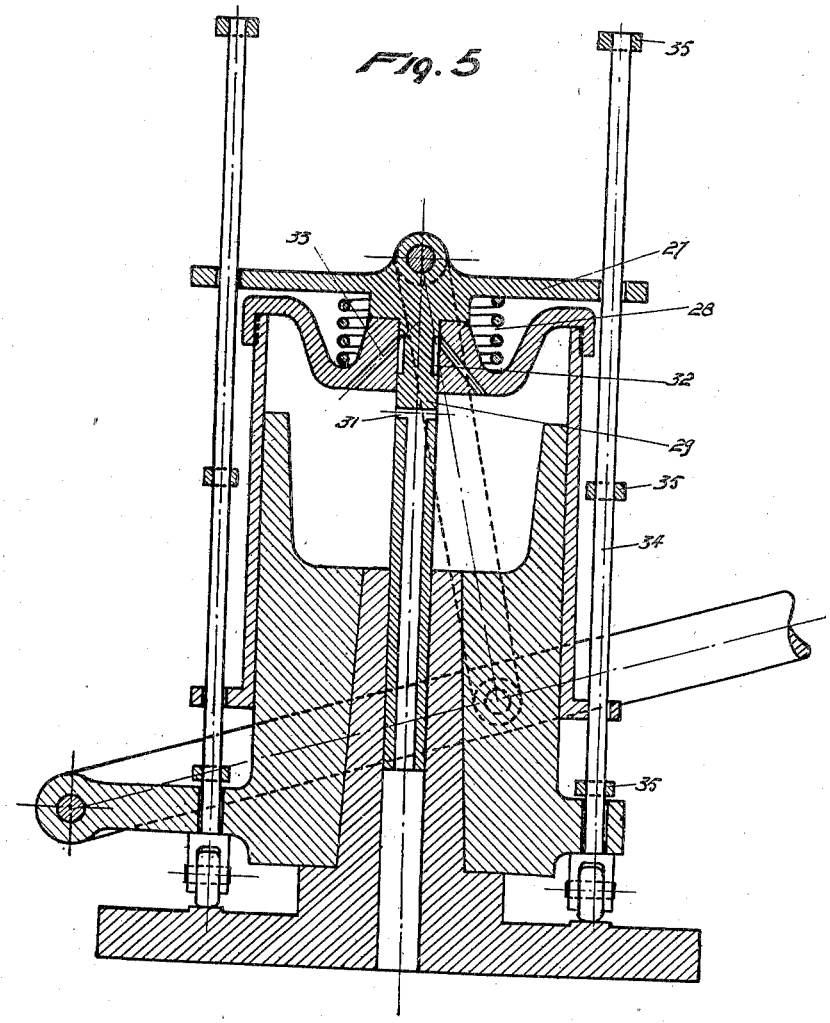
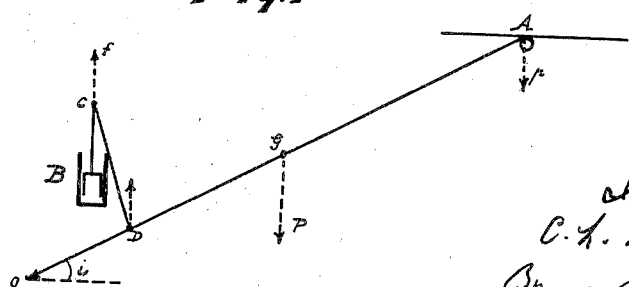
Inventor:
C. L. Delachaux
By E. F. Wenderoth
Atty April 8, 1941.  C. L. DELACHAUX  2,237,590
TROLLEY SYSTEM
Filed Aug. 5, 1939   4 Sheets-Sheet 2
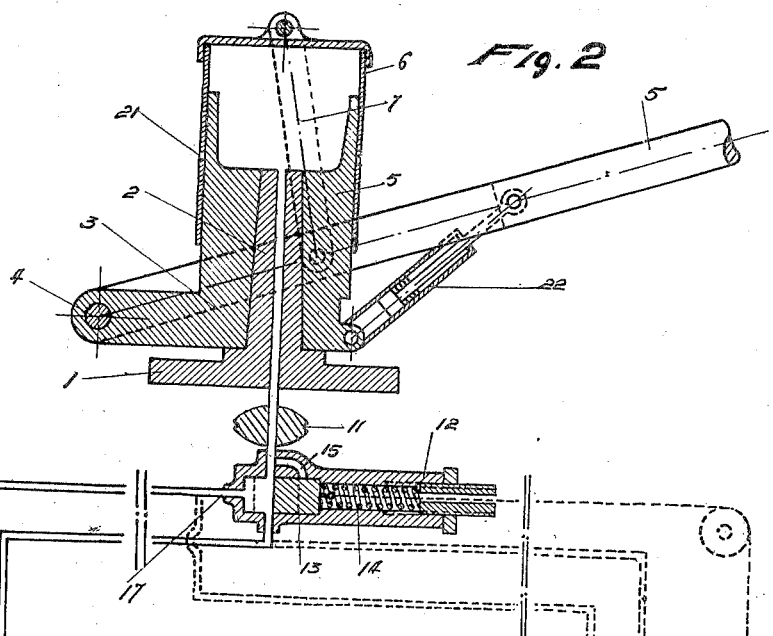
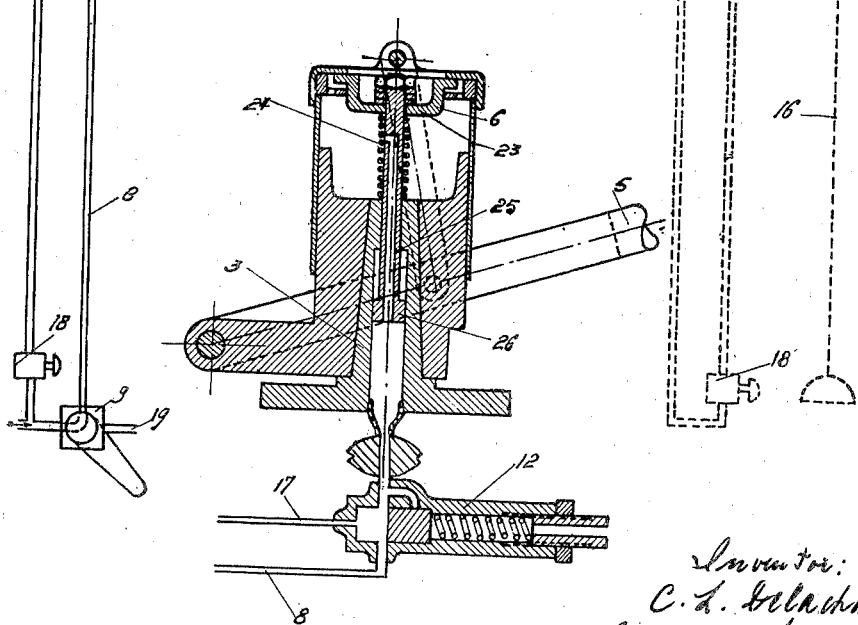
Inventor:
C. L. Delachaux April 8, 1941. C. L. DELACHAUX 2,237,590
TROLLEY SYSTEM
Filed Aug. 5, 1939 4 Sheets-Sheet 3

Inventor:
C. L. Delachaux

April 8, 1941.   C. L. DELACHAUX   2,237,590
TROLLEY SYSTEM
Filed Aug. 5, 1939.   4 Sheets-Sheet 4

Patented Apr. 8, 1941

2,237,590

UNITED STATES PATENT OFFICE 2,237,590

TROLLEY SYSTEM

Clarence Leon Delachaux, Paris, France

Application August 5, 1939, Serial No. 288,673
In France August 5, 1938

10 Claims. (Cl. 191—67)

The trolley poles supporting a current collector, such as a roller or a sliding piece contacting with a feed wire must be provided with a device tending to raise them in order to urge the current collector against the wire for maintaining a good contact between them.

Heretofore such devices comprised springs having the drawback that the pressure between the current collector and the feed wire depended on the bending of said springs and therefore on the slope of the pole. On the other hand, in order to bring the pole to its rest position, i. e., substantially horizontal, it is necessary to operate it by means of a rope, which is used also to again establish contact with the wire. To do this, the driver must leave his post.

It has been proposed to overcome the above difficulties by using electrical devices, but these latter are very complicated.

Furthermore, most cars carry a supply of compressed air in special tanks for braking or other purposes. An object of the invention is the provision of means whereby the force exerted on the trolley pole in order to insure a good contact between the feed wire and the current collector is produced by compressed air.

Another object of the invention is the provision of means operated by compressed air whereby the pressure between the current collector and feed wire is substantially independent of the slope of the trolley pole.

A further object of the invention comprises the provision of means operated by compressed air, capable of being controlled from different places in the car, to lower automatically the pole till it comes into its rest position either when the slope of the pole has reached a predetermined value or as soon as said pole has jumped off the feed wire.

A further object of the invention is a trolley system operated by compressed air wherein at the end of its downward movement the pole slides on convenient guides and come into its rest position in the longitudinal plane of symmetry of the car by the action of its own weight cooperating with that of the compressed air. The invention will be more easily understood by the following description made by way of example with reference to the following drawings in which:

Fig. 1 is a diagram showing how a constant pressure between the wire and current collector corresponds to a constant air pressure regardless of the slope of the pole;

Fig. 2 is a diagrammatic cross section of the entire system;

Figs. 3, 4, 5 and 6 are vertical sectional views with parts shown diagrammatically of modifications of said system;

Figure 4:
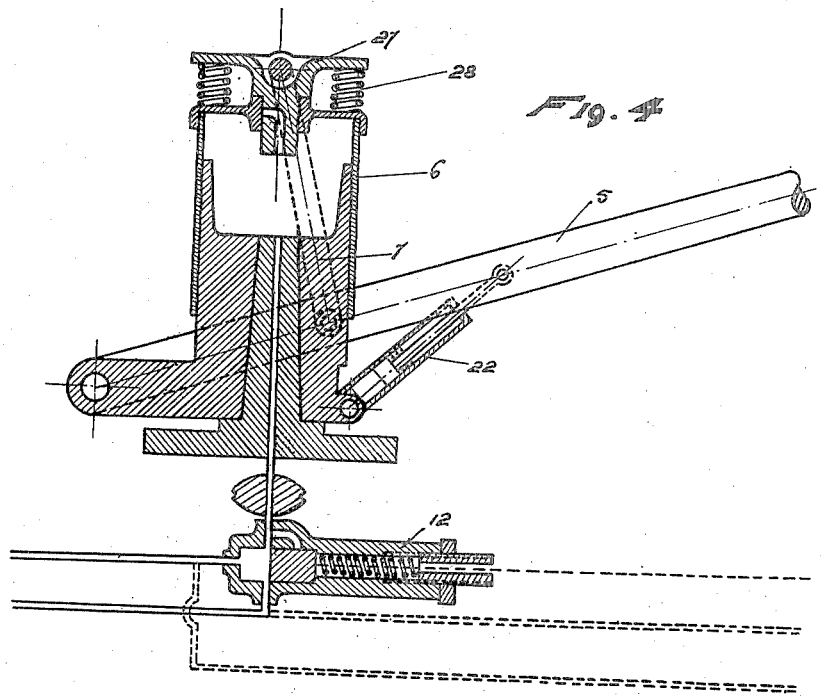

In Fig. 1, AO represents a trolley pole, able to rotate round point O, and bearing at A on the feed wire with a pressure $p$. The weight P of the pole is applied at its center of gravity $g$ and the raising apparatus comprises a vertical cylinder B receiving the compressed air and in which moves a piston connected by the driving rod CD with the pole OA. If $s$ is the area of the piston and $t$ the pressure of the air thereon a vertical force $f=st$ will be applied at C.

If things are so disposed that the rod CD remains substantially vertical, the system will be operated as if said vertical force $f$ was applied at D and the equation of equilibrium may be written:

$$\cos i \times f \times OD = \cos i \times Og \times P + \cos i \times p \times OA$$

and therefore $$p = \frac{s \times t \times OD - P + Og}{OA}$$

the pressure between the wire and the current collector will thus remain constant whatever might be the slope of the pole.

Fig. 2 shows diagrammatically an embodiment of a system according to said principle.

It comprises a circular shoulder 1 with a pin 2 on which may rotate by suitable bearings a body 3 on which is journaled in 4 the pole 5. On said body 3 slides a cylinder 6 shaped as a closed bell connected with the pole by lateral driving rods 7. The body therefore acts as a piston and the bell as a cylinder, the whole occupying a very small volume.

The compressed air is fed from a tank (not shown) by a duct 8 provided with a three way cock 9. Said duct communicates at 11 with a channel bored through the pin 2 for allowing the compressed air to arrive under the bell 6. In the duct there is inserted a valve 12 controlling the air and at the same time permitting the interior of the bell to communicate with the atmosphere. The valve may have several forms and in Figure 2 it is represented as constituted by a cylinder wherein slides a piston 13 urged to the left by a spring 14 and acting like a slide valve. The operation of said device may be easily understood.

In inoperative position the valve piston 13 urged to the left by the spring 14 is in the position represented by dotted lines, and closes communication between the duct 8 and the channel in pin 2 and, since it uncovers the bypass 15, connects the channel and thus the interior of the bell 6 with the atmosphere.

For raising the trolley pole 5 the cock 9 is opened and the piston 13 is moved to the right, either by pulling a rope 16 or by sending compressed air in the duct 17 controlled by a push valve 18 and thus compressed air flows into the bell 6. It is, of course, possible to dispose several push-valves like 18 in different places in the car, such as 18' in order to control the raising of the pole from different places.

The compressed air arriving under the bell 6 lifts it and raises the pole by means of the connecting rods 7.

When the pole is to be lowered the three way cock 9 is turned so as to connect the duct 8 by 19 with the atmosphere. The depression thus produced results in the valve piston 13 being urged to the left by the spring 14 and the air under the bell 6 flows out by the channel 15 and the pole returns under its own weight into its rest position.

If, for any cause, the trolley pole jumps off the wire, it rises and lifts also the bell 6, but at a certain position of the latter, ports 21 bored in the wall of the bell, come above the edge of the body 5, and the pressure in the bell is relieved which, as in the former case, allows the piston 13 to move to the left and thus closes the duct 8 and produces the further exhaust of the air in the bell through the by-pass 15.

Thus, if the pole jumps off, it returns immediately afterward into its lowest position.

In order to prevent the pole from assuming an excessive inclination, stops may be provided, such as a telescopic rod 22 with a dash-pot which operates also as a brake.

Fig. 3 illustrates a modification of the device of Fig. 2.

The bell is not provided with ports 21 but its top is apertured and closed by a flap 23 applied thereon by a spring 24. The flap is connected to a tubular stem 25 ending in an enlargement 26 and sliding in a channel bored in the pin 3, the compressed air being fed under the bell through tubular stem 25.

When the pole reaches the greatest inclination permitted, the enlargement 26 contacts with the channel top and prevents the flap 23 from following the displacement of the bell 6 and so, as will be seen from Figure 3, the flap will open and the air contained in the bell will flow out producing a sudden depression which, in the same way as in the former case, closes the valve 12.

The enlargement 26 may of course be used for limiting the upward stroke of the pole.

With the above disclosed devices the sudden depression was produced when the pole reached a determined position, but said depression may also be produced as soon as the pole having jumped off, the pressure between the current collector and the wire ceases. Fig. 4 shows such a device.

The connecting rods 7 are not fastened directly on the bell 6 but on a flap 27 which closes the top of the bell. Springs 28 tend to lift said flap but they are so adjusted that it remains closed when the pressure of the current collector on the wire is added to the weight of the pole, but if said pressure ceases the flap is lifted by the springs. It is obvious that as soon as the pole has jumped off, the flap will open and this opening will result in a depression operating the valve 11 as in the former cases.

Many modifications may be made in the valve 12. It is only required that said valve should be operated by a sudden depression produced inside the bell for closing the compressed air duct and establishing a communication between the interior of the bell and the atmosphere. Figure 4 shows a device operated by the jumping off of the pole whatever might be the slope thereof.

In the top of the bell, as in Fig. 5, is provided a flap 27 lifted by springs 28 as soon as the current collector has jumped from the feed wire. The flap is integral with a hollow stem 29 through which the compressed air is introduced into the bell by the ports 31. When the trolley pole having jumped off allows the spring 28 to lift the flap 27, the ports 31 are covered by the top of the bell and the flow of compressed air ceases. At the same time an annular groove 32 provided at the top of the stem and communicating with the interior of the bell by the ports 33 is raised sufficiently to communicate with the atmosphere and allow the exhaust of the compressed air remaining inside the bell.

Stems 34 are engaged in apertures provided in the flap 27 and are not only used as guides but may also carry adjustable rings 35 acting as stops for determining the highest and lowest position of the pole.

Figure 6:
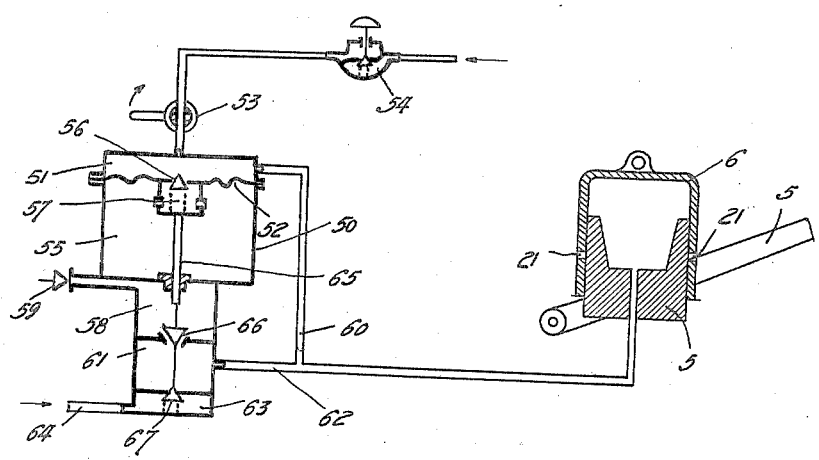

Fig. 6 shows diagrammatically a modification using a diaphragm valve.

The valve represented is known by itself and the invention concerns only its application to a trolley system and the manner in which it is connected with the different members of said device.

This valve comprises a casing 50 divided into several chambers separated from one another by a diaphragm and different partitions.

Chamber 51 disposed on one side of the diaphragm 52 may be connected by a cock 53 either with the atmosphere or with one or several devices, such as the cock 54, controlling a compressed air supply, and a duct 60 communicating with a bell used for the raising of the pole. The chamber 51 may also communicate with the chamber 55, on the other side of the diaphragm, through the medium of a valve 56 which a spring 57 tends to keep closed. The chamber 58 communicates with the atmosphere through the medium of an adjustable gauge valve 59 and the chamber 61 communicates by means of the duct 62 with the inside of the bell 6. The last chamber 63 communicates by 64 with the compressed air feeding manifold. On the diaphragm 52 is fixed a stem 65 which passes fluid tightly through the bottom of the chamber 55 and supports the flaps of valves 66 and 67 connecting the median chamber 61 either with the chamber 58 or with the chamber 63 according to the position of the diaphragm.

The device works as follows.

If it is desired to raise the pole from its lowest position, it is sufficient to open even during a very short time, the cock 54. Compressed air penetrates then into the chamber 51 and pushes the diaphragm downwardly, which results, by the operation of valves 66 and 67, in separating the chamber 58 from the chamber 61 and connecting the latter with the chamber 63. Consequently the compressed air fed by 64 will flow through chamber 63, the open valve 67, the chamber 61 and the duct 62, will penetrate then under the bell 6 which will be lifted and the pole raised. The compressed air penetrates also through 60 into the chamber 51 thus continuing the action brought about by the operation of the cock 54. By the pressure in the room 51, the valve 56 is opened and the pressure takes the same value in the chamber 55 as in the chamber 51, nevertheless the valves 66 and 67 remain in their position because of the pressure exerted on the stem 65 acting then as a piston.

If it is desired to lower the pole, it is sufficient to open the cock 53. A sudden depression occurs and the diaphragm is pushed upwards by the compressed air contained in the chamber 55, the position of valves 66 and 67 changes, the first one connects the bell 6 with the atmosphere through the duct 62, the chamber 61, the open valve 66, the chamber 58 and the gauge valve 59 while the closed valve 67 prevents the penetration of compressed air into chamber 61. This results in the pole descending with a speed to which it is possible to give any desired value by adjustment of the gauge valve 59.

If the pole jumps off, and raises suddenly, the ports 21 arrive above the edge of the body 3 and consequently a sudden depression is produced under the bell. This depression is transmitted through duct 60 to the chamber 51 and all happens as disclosed above.

Figure 7:
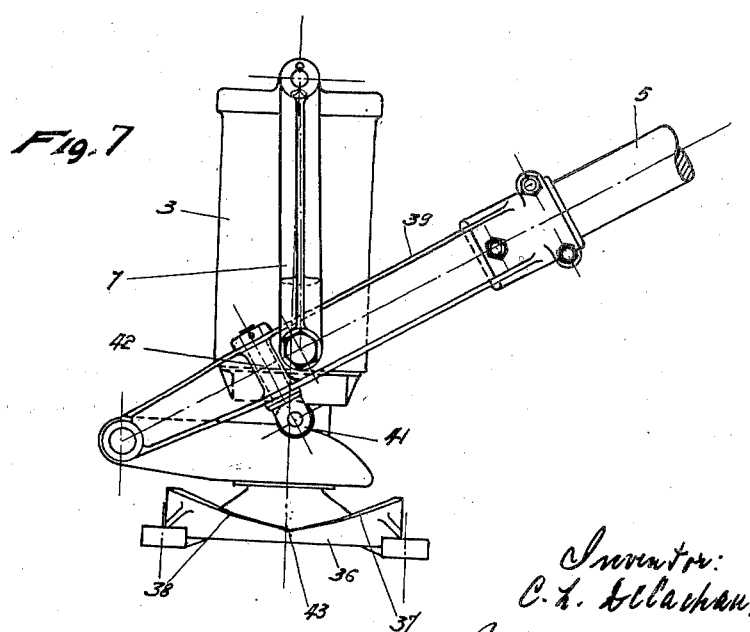
Fig. 7 shows how the pole may be brought automatically into its rest position.

It is desirable that the pole should be brought automatically parallel to the axis of the car when lowered in its rest position. Fig. 7 illustrates by way of example a device allowing such result to be obtained.

On the shoulder of the device is disposed a sort of cam provided with four circular guides, 37, 38 and the guides are symmetrical with reference to the axial plane of the car. On the socket 39 supporting the pole are symmetrically fixed, if desired by the intermediary of resilient dampers 42, two rollers such as 41, the axis of which are perpendicular to the pole.

Said device operates as follows. When the compressed air flows out from the bell 6, the pole is lowered and the rollers 41 come in contact with the guides such as 37 or 38 and because of the weight of the pole roll thereon to their lowest part 43. It will be seen that the pole is then in the axial plane of the car.

Instead of four guides such as 37, 38 it would be possible to use only two, symmetrical then with reference to the axial plane of the car, and also only one roller disposed in the same vertical plane as the pole, its axis being parallel thereto.

Nevertheless the first form of execution illustrated in Figure 7 is to be preferred for the following reasons. When the pole during its downward movement is not in the axial plane of the vehicle, said movement is stopped when the rollers such as 41 bear on the corresponding guides. Let us assume that at this moment the axis of the pole forms an angle $a$ with that of the car and that the slope of the guide is $p$, the difference in height $h$ of the roller for said position and for its lowest one, for which the pole is in the axial plane of the car, is then $h=pa$.

It is advantageous that said height be the least possible and not greater than a maximum H. Thus with the device of Fig. 7, viz. with four guides, we will have $$p = \frac{H}{90°}$$

and with the device represented with only two guides.

$$p' = \frac{H}{180°}$$

The value of the slope $p$ in the first case will be the double of the same in the second case.

But on the other hand the rotation movement of the pole will be the more easy as said slope is the greater and it is therefore advantageous to use the first device which, further, allows the pole to take two rest positions opposite to one another.

If the weight of the pole was not sufficient the bell shown in the Figures 2 to 6 might be replaced by a double stroke cylinder with a piston, the pressure of the air acting on the upper face of the piston during the downward movement of the pole and cooperating thus with gravity.

In some cases it may be preferred that the pole should be brought in an horizontal position but in the vertical plane wherein it was when jumping off. In such case the guides such as 37 and 38 would be replaced by any convenient braking system holding the pole in the same vertical plane during its downward displacement but allowing it to rotate round a vertical axis while the car is running, so that it may always remain in contact with the wire say on curves.

What I claim is:

1. A trolley system comprising a base, a piston and a cylinder, said piston being fixed for rotation only on said base and said cylinder sliding vertically upon said piston, a trolley pole pivoted on said piston, connecting means for said trolley pole connected to said cylinder and pole in such manner that said connecting means remain substantially vertical when the pole is in normal operating position and means feeding compressed air to the cylinder and means placing said cylinder in communication with the atmosphere when the pole jumps off the trolley wire.

2. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, means operated at will for feeding and exhausting compressed air in and from the cylinder and responsive to a sudden decrease of pressure occurring in said cylinder for closing the arrival of compressed air and connecting the cylinder with the atmosphere.

3. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, a slide valve controlling the cylinder and adapted to take two positions for connecting said cylinder respectively with a compressed air duct and with the atmosphere, said valve comprising means responsive to a high pressure in the cylinder tending to keep the valve in the position connecting the cylinder with the compressed air duct, and a spring tending to bring said valve in its other position.

4. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, a diaphragm valve consisting in a casing separated in two chambers by a diaphragm, one of said chambers communicating with the cylinder, valves responsive to the operation of said diaphragm by the pressure in said last mentioned chamber and connecting said cylinder respectively, according to their position, with a compressed air feeding duct and with the atmosphere.

5. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, means operated at will for feeding and exhausting compressed air in and from the cylinder and responsive to a sudden decrease of pressure occurring in said cylinder for closing the arrival of compressed air and connecting the cylinder with the atmosphere, means responsive to the cylinder coming into a position corresponding to a predetermined inclination of the pole for producing a sudden decrease of pressure in the cylinder.

6. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, means operated at will for feeding and exhausting compressed air in and from the cylinder and responsive to a sudden decrease of pressure occurring in said cylinder for closing the arrival of compressed air and connecting the cylinder with the atmosphere, ports bored in the cylinder wall in such a position that they remain normally covered by the piston and are uncovered when the cylinder reaches a position corresponding to a predetermined inclination of the pole.

7. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, means operated at will for feeding and exhausting compressed air in and from the cylinder and responsive to a sudden decrease of pressure occuring in said cylinder for closing the arrival of compressed air and connecting the cylinder with the atmosphere, a valve supported by the cylinder, able to connect the cylinder with the atmosphere, means responsive to the position of the cylinder for keeping normally said valve closed and for opening it when the cylinder reaches the position corresponding to a predetermined inclination of the pole.

8. A trolley system comprising a shoulder, a piston rotatably mounted on said shoulder, a pole pivotally mounted on said piston and a cylinder vertically movable on said piston, connecting rods connecting said pole with said cylinder in such a way that said connecting rods remain substantially vertical for the positions taken by the pole during normal run, means operated at will for feeding and exhausting compressed air in and from the cylinder and responsive to a sudden decrease of pressure occuring in said cylinder for closing the arrival of compressed air and connecting the cylinder with the atmosphere, means responsive to cessation of the pressure exerted by the feeding wire on the end of the pole after a jumping off of said pole for producing a sudden decrease of pressure in the cylinder.

9. A trolley system comprising a shoulder, a piston rotatably mounted on said shoulder, a pole pivotally mounted on said piston and a cylinder vertically movable relatively thereto, a valve disposed in said cylinder, connecting rods connecting said valve with the pole in such a way that said rods remain substantially vertical for the positions taken by the pole during normal run, means operated at will for feeding and exhausting compressed air in and from the cylinder and responsive to a sudden decrease of pressure occuring in said cylinder for closing the arrival of compressed air and connecting the cylinder with atmosphere, springs tending to open said valve and so adjusted that the valve remains closed when the pressure of the wire on the end of the pole is added to the pole weight and that said valve opens when said pressure ceases.

10. A trolley system comprising a shoulder, a pole rotatably mounted on said shoulder, means actuated by compressed air for lifting and lowering at will said pole and lowering it when the pole has jumped off, at least two symmetrical inclined guides fixed on the shoulder, rollers fixed on the pole and adapted to come in contact with and roll on said guides when the pole descends, the pole arriving then in the longitudinal plane of the vehicle carrying the trolley system when in its lowest position.

CLARENCE LÉON DELACHAUX.